United States Patent
Satyanarayanan (10) Patent No.: US 9,654,522 B2
(45) Date of Patent: May 16, 2017

(54) METHODS AND APPARATUS FOR AN INTEGRATED INCUBATION ENVIRONMENT

(71) Applicant: salesforce.com, inc., San Francisco, CA (US)

(72) Inventor: Rajaram Satyanarayanan, San Jose, CA (US)

(73) Assignee: Salesforce.com, Inc., San Francisco, CA (US)

(*) Notice: Subject to any disclaimer, the term of this patent is extended or adjusted under 35 U.S.C. 154(b) by 169 days.

(21) Appl. No.: 13/874,018

(22) Filed: Apr. 30, 2013

(65) Prior Publication Data

US 2013/0297695 A1 Nov. 7, 2013

Related U.S. Application Data

(60) Provisional application No. 61/640,778, filed on May 1, 2012.

(51) Int. Cl.
| | |
|---|---|
| *G06F 15/16* | (2006.01) |
| *H04L 29/06* | (2006.01) |
| *G06Q 10/10* | (2012.01) |
| *H04L 29/08* | (2006.01) |

(52) U.S. Cl.
CPC ......... *H04L 65/403* (2013.01); *G06Q 10/101* (2013.01); *H04L 67/02* (2013.01)

(58) Field of Classification Search
CPC .. G06Q 10/103; G06Q 10/101; H04L 65/403; H04L 67/02
See application file for complete search history.

(56) References Cited

U.S. PATENT DOCUMENTS

| | | | |
|---|---|---|---|
| 7,149,776 B1* | 12/2006 | Roy et al. | 709/205 |
| 8,280,821 B1* | 10/2012 | Smith et al. | 705/319 |
| 2012/0317108 A1* | 12/2012 | Okazaki | G06F 3/0488 707/732 |
| 2013/0262168 A1* | 10/2013 | Makanawala | H04L 51/32 705/7.14 |
| 2013/0297714 A1* | 11/2013 | Basu et al. | 709/206 |

OTHER PUBLICATIONS

LiveConnect Release Notes: Ivy 1.16, "HiveLive LiveConnect Community Platform." Jul. 22, 2009.*

* cited by examiner

*Primary Examiner* — June Sison
*Assistant Examiner* — Steven Nguyen
(74) *Attorney, Agent, or Firm* — Lorenz & Kopf, LLP (57) ABSTRACT

A method includes providing a first party and a second party access to an integrated incubation environment (e.g., a multi-tenant system) residing on a server; storing, on the server, information relating to a collaborative project, wherein a first portion of the information is received from the first party, and a second portion of the information is received from the second party; and presenting the information to the first party and the second party over a network using at least one social network component.

14 Claims, 7 Drawing Sheets

METHODS AND APPARATUS FOR AN INTEGRATED INCUBATION ENVIRONMENT

CROSS-REFERENCE TO RELATED APPLICATION(S)

This application claims the benefit of U.S. provisional patent application Ser. No. 61/640,778, filed May 1, 2012, the entire contents of which are incorporated by reference herein.

TECHNICAL FIELD

Embodiments of the subject matter described herein relate generally to computer systems, and more particularly, embodiments of the subject matter relate to methods and systems for collaboration in a networked environment.

BACKGROUND

It is often desirable for small, newly-formed startup companies to collaborate with larger corporations as well as certain third-party stakeholders, such as venture capitalists, local governmental agencies, and the like. In that regard, startup companies often begin within what is termed an "incubation" environment. While large corporations may have access to significant resources and experience, they are often burdened by the need for extensive strategic planning and other characteristics of an entrenched bureaucracy. Thus, large companies may be slow to recognize and develop innovative products and services. In contrast, small startups can be quick to plan and implement innovations, but typically lack necessary resources and experience. Furthermore, coordination and communication between large companies, start-ups, and third-party stakeholders with respect to numerous innovative products and services can be intractable.

Accordingly, there is a need for improved systems and methods for managing collaborative projects in the context of an incubation environment.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to an integrated incubation environment that allows multiple parties—such as startup companies, large corporations, and third-party stakeholders—to efficiently collaborate on projects within the context of a secure social network that provides a single, common eco-system.

Figure 1:
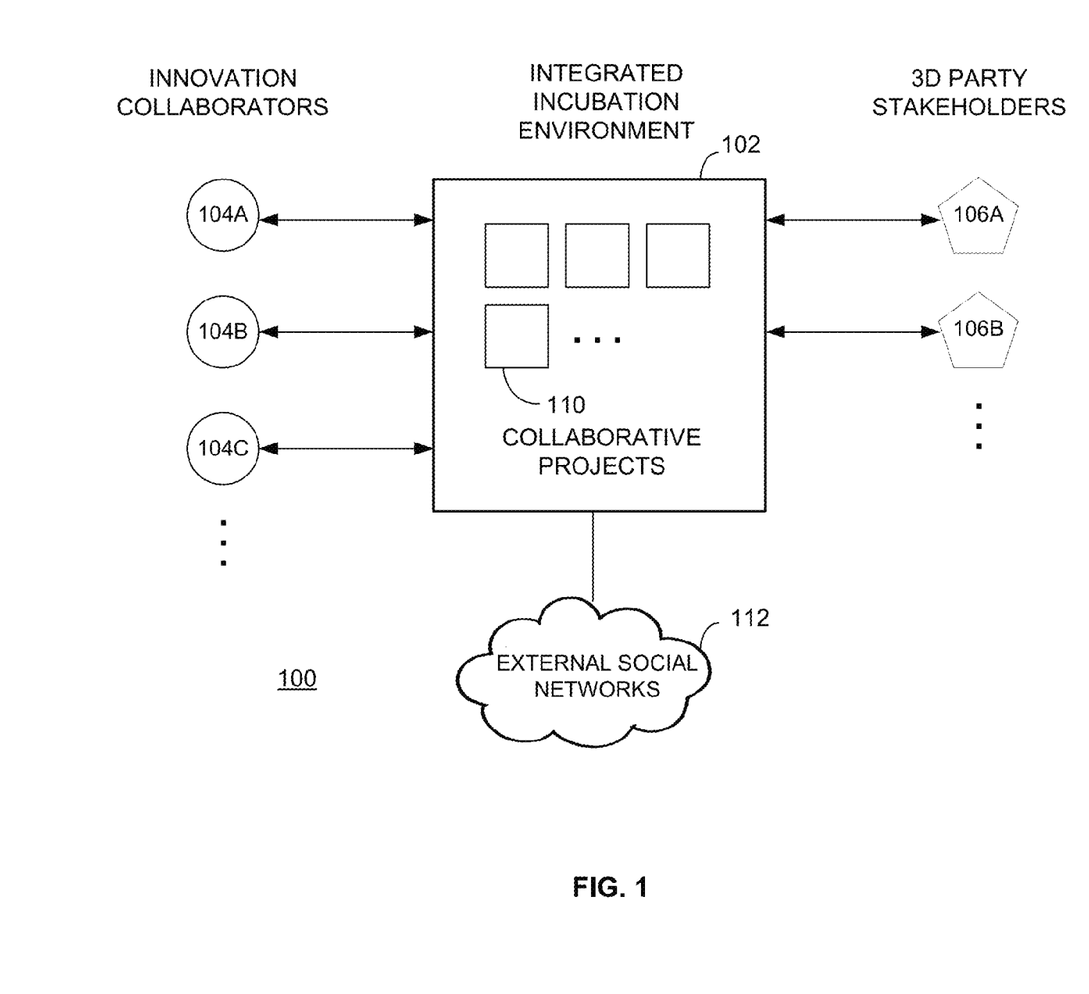
FIG. 1 is a conceptual block diagram depicting a system in which an exemplary integrated incubation environment may be employed.

FIG. 1 is a conceptual block diagram depicting a system 100 in which an exemplary integrated incubation environment may be employed. As shown, system 100 generally includes an integrated incubation environment (or simply "environment") 102, innovation collaborators 104 (e.g., 104A-104C), third-party stakeholders (or simply "stakeholders") 106 (e.g., 106A and 106B), and one or more external social networks 112. Environment 102, through any suitable combination of hardware and software, is generally configured to provide innovation collaborators 104 and third-party stakeholders 106 a convenient way to collaborate on one or more collaborative projects (or simply "projects") 110 within environment 102 while also accessing relevant information from external social networks 112.

As used herein, the term "social network" refers to any combination of software, protocols, and/or hardware configured to allow a community of individuals and/or other entities to share information, resources, and the like via a computer network (such as the Internet). External social networks 112 comprise one or more social networks that operate outside of environment 102 (but which may interact with a social network implemented within environment 102). Example external social networks 112 include, for example, LinkedIn®, Facebook®, Twitter®, Pinterest®, Google Plus+®, and the like.

As mentioned in further detail below, integrated incubation environment 102 may be implemented on or within a social networking platform, or may simply provide functionality and modes of interaction that are characteristic of social networking platforms (e.g., status updates, news feeds, instant messaging, sharing links, and the like). Components that provide such functionality are referred to as "social network components" herein. In one embodiment, for example, environment 102 is implemented using the Chatter® collaboration platform provided by Salesforce.com, Inc. of San Francisco, Calif. In a particular embodiment, environment 102 is implemented within a multi-tenant system, described in further detail below. The invention is not so limited, however, as any combination of software tools capable of providing the functionality described herein may be employed.

With continued reference to FIG. 1, innovation collaborators 104 comprise individuals and/or entities that take part in developing, supporting, marketing, testing, or otherwise assisting with realization of one or more collaborative projects 110. In that regard, innovation collaborators 104 might include, for example, software developers, product marketers, product managers, and the like from one or more companies or entities.

Third-party stakeholders 106 comprise individuals and/or entities that have an interest in one or more collaborative projects 110 (financial, regulatory, or otherwise), but which would not directly assist in development of those projects. Such stakeholders 106 might include, for example, venture capitalists, local government officials wishing to promote innovation in its community, or the like.

Innovation collaborators 104 and third-party stakeholders 106 may interact with environment 102 via one or more other networks (not shown), such as the Internet, enterprise intranets, and the like, using any suitable computing device, such as a desktop computer, a laptop computer, a tablet computer, a mobile device (such as smartphones), or the like. Interaction may, for example, take place via a conventional web (http) interface and/or through client software resident within the computing device. In that regard, integrated incubation environment 102 employs suitable authentication/security schemes configured to allow innovation collaborators 104 and stakeholders 106 access to only those collaborative projects 110 with which they are associated. Furthermore, as described in further detail below, different parties will typically be allowed access to only that information that is germane to their specific roles vis-a-vis a particular collaborative project 110.

Collaborative projects 110 each comprise any type of project that might benefit from collaboration as described herein. In some embodiments, for example, collaborative projects 110 comprise software development projects—e.g., the creation of applications and/or other software components. In a particular embodiment, for example, projects 110 comprise software development projects implemented via a multi-tenant system platform, as described in further detail below. Software development within environment 102 might take place in accordance with a particular methodology, such as the Agile or Waterfall methodologies, known in the art. Further, templates, perspectives, and/or other frameworks may be provided to collaborators to standardize the submission of software code to a project 110. Third-party tools such as visualization tools, multimedia tools, and the like may be provided within environment 102 to allow collaborators and/or stakeholders to create high-quality materials for sharing—e.g., marketing materials, etc.

Figure 2:
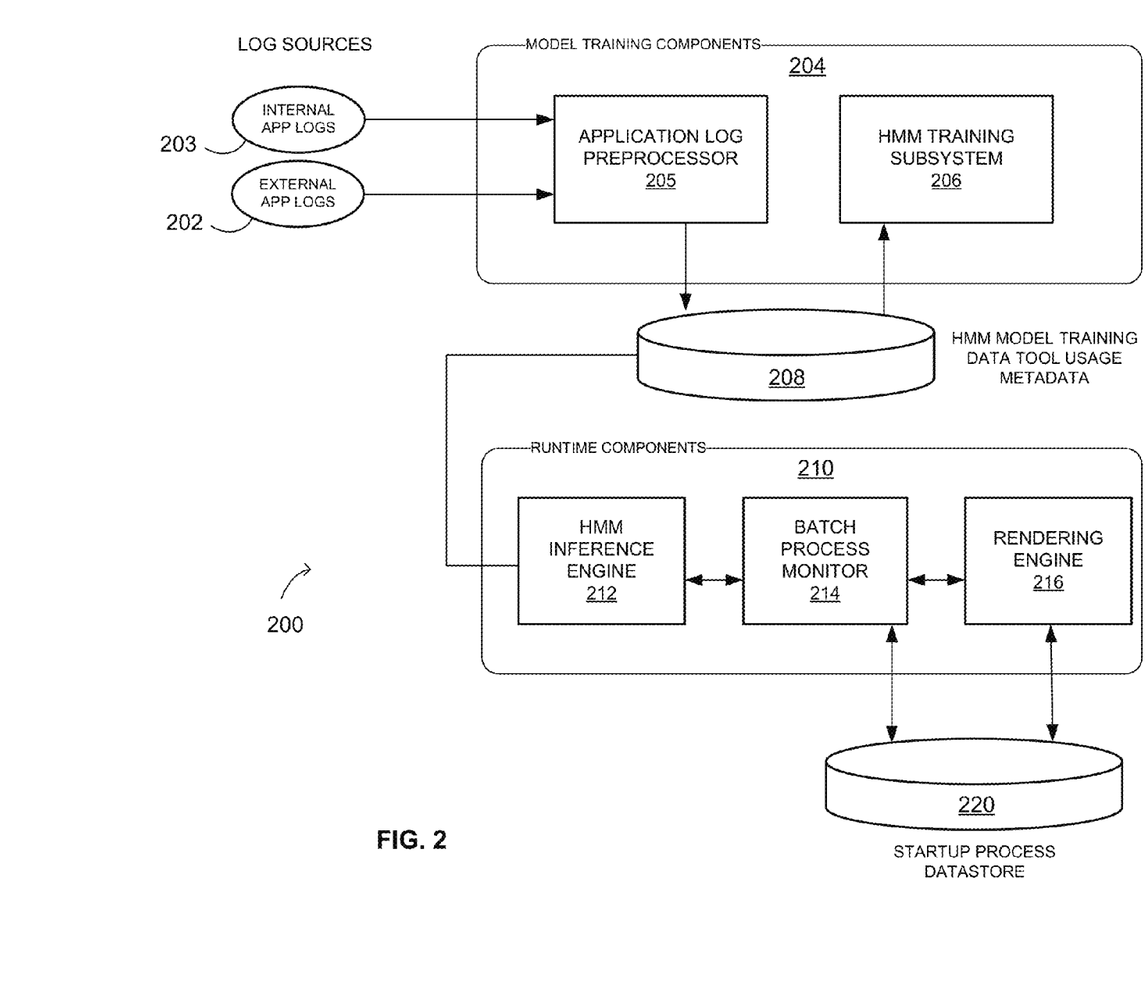
FIG. 2 is a conceptual block diagram depicting various components of an exemplary integrated incubation environment.

FIG. 2 is a conceptual block diagram of a system 200 depicting various components of an exemplary integrated incubation environment such as that shown in FIG. 1. In general, the system 200 includes model training components 204, runtime components 210, databases 208 and 220, and log sources 202 and 203. Model training components 204 include an application log preprocessor 205 and a Hidden Markov Model (HMM) training subsystem 206. Runtime components 210 include an inference engine 212, a batch processing monitor 214, and a rendering engine 216.

In connection with model training, internal application logs 203 and external application logs 202 are received by preprocessor 205, which is configured to produce model training data and tool usage metadata that is stored within database 208. This data is then provided to training subsystem 206 for analysis. In one embodiment, application log preprocessor 205 includes two or more sub components—"crawl-log" sources (i.e., information received via a network crawling process) and related feature-based example data extraction in a structured or semi-structured format. The example data will typically be further divided into test and cross-validation data. Tool usage metadata may be gathered, for example, using a methodology as set forth in U.S. patent application Ser. No. 13/841,277, entitled "Mechanism for Facilitating Dynamic Interaction with Development Applications and Tools in an On-Demand Services Environment."

HMM training subsystem 206 consumes test data from database 208 for machine learning and/or for generating models to be used by HMM inference engine 212. The cross-validation data comprises labeled data used for testing the generated models for accuracy, as is known. Inference engine 212 then accesses the data stored within database 208, and in conjunction with batch process monitor 214 and rendering engine 216 interacts with startup process data stored and accessed from database 220.

HMM inference engine 212 uses one or more models generated by HMM training subsystem 206 for decoding the most likely hidden state or process for a sequence of observations provided by batch process monitor 214. While the illustrated embodiment utilizes a hidden Markov model approach, the embodiments are not so limited: other suitable methods for determining hidden states or processes may be employed.

Batch process monitor 214 is configured to track startup interactions with various software tools, and invokes HMM inference engine 212 for inferring hidden processes at, for example, periodic intervals—such as once a day, once a week, or once a month. The inferred hidden processes are tagged, along with any other metadata relating to the startup entity, and stored in a persistent manner in startup process datastore 220 using a format suitable for rendering engine 216. Rendering engine 216 is configured to render information in accordance with a user interface, such as that shown in FIG. 4 (described in further detail below). That is, rendering engine 216 produces a display based on inferred processes and context-based enabling of related messaging tools, such as audio/video conferencing, group messaging, screen-sharing, and the like.

Figure 3:
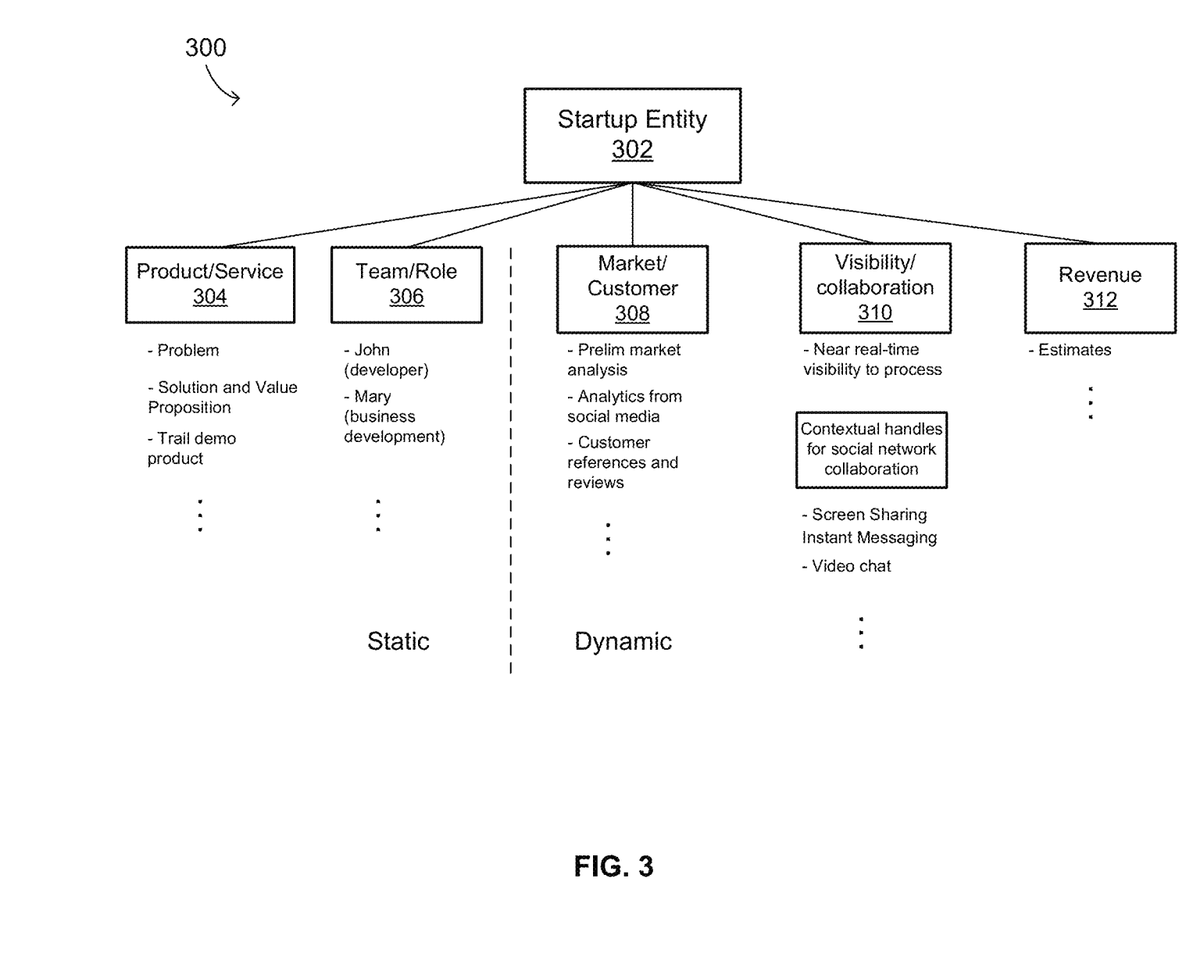
FIG. 3 is a conceptual block diagram depicting a startup model in accordance with one embodiment.

FIG. 3 is a conceptual block diagram depicting a model 300 in accordance with one embodiment for an example startup entity 302. More particularly, FIG. 3, which will be described in conjunction with FIG. 1, presents various categories of information components that might be provided to collaborators in the context of an integrated incubation environment 102. In general, these categories include product and/or service information 304, team/role information 306, market/customer information 308, visibility/collaboration 310, and revenue information 312. Product/service category 304 includes, for example, information regarding the problem being solved, the solution and value proposition provided by the project, and one or more demos or the like related to the project. Team/role category 306 includes, for example, information regarding the various team members for the project (i.e., 104 and 106 in FIG. 1) such as the names and roles of developers, business development personnel, and the like.

Market/customer category 308 includes, for example, information relating to preliminary market analysis, analytics from social media (e.g., external social networks 112), customer references, and customer reviews. Such information may be provided using tools such as Adwords-based analytics, Chatter®-analytics or the like. Revenue category 312 includes, for example, information relating to revenue estimates, support, and service. Visibility/collaboration category 310 includes, for example, information and tools capable of keeping collaborators 104 and stakeholders 106 up-to-date (in near real-time) on the status of individual projects 110.

As noted above, this visibility may be provided using social networking platform that provides, for example, audio/visual communication tools (e.g., video chat), screen sharing (i.e., the sharing of information on an individual's computer display), group messaging, and collaboration "feeds" (such as status updates, newsfeeds, etc.). Contextual handles (e.g., keywords, such as "hash-tags" associated with particular projects 110) may be provided for this purpose. For example, in the case that a collaborative project 110 is a software component called "Foo," the contextual handle might appear as "#projectFoo" or the like.

In general, categories 304 and 306 can be considered "static," as they will not typically change significantly during the lifetime of a project 110, while categories 308, 310, and 312 can be considered "dynamic," as they will typically change quickly during the lifetime of a project 110. In that regard, certain information within system 300 may be "mined" or otherwise received from external social networks 112, and updated accordingly. For example, environment 102 might compile information regarding how a particular project (e.g., a beta software release) is perceived by Twitter® or Facebook® users.

Figure 4:
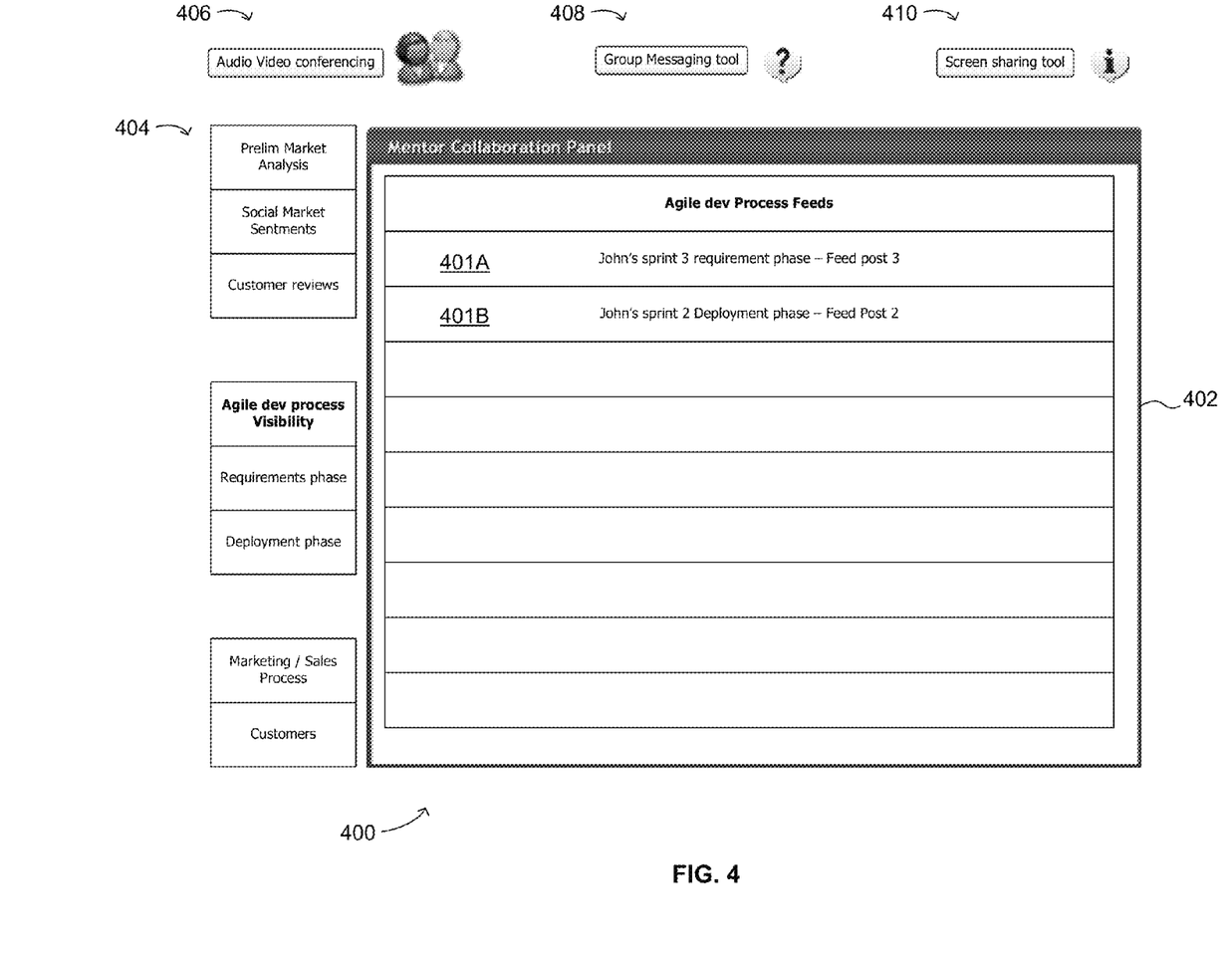
FIG. 4 is an exemplary user interface for a mentor collaboration panel in accordance with one embodiment.

FIG. 4 is an exemplary user interface (UI) 400 for a mentor collaboration panel in accordance with one embodiment. That is, FIG. 4 depicts an example display that might be produced for by environment 102 for presentation by a collaborator's computing device. In this non-limiting example, user interface 400 includes a collaboration panel 402, one or more UI components (e.g., buttons) providing access to various collaboration tools (audio/video conferencing 406, group messaging tool 408, and screen-sharing tool 410), and one or more UI components 404 (e.g., buttons) that specify the scope of information to be displayed within panel 402. In the illustrated embodiment, UI components 404 specify information relating to preliminary market analysis, social market sentiments, customer reviews, development process visibility, requirements phase, deployment phase, marketing/sales process, and customer information. As shown, the "Agile development process visibility" UI component has been selected, and as a result panel 402 is populated with a "feed" of information comprising two posts: post 401A and 401B. The collaborator or stakeholder may then click or otherwise interact with posts 401A and 401B to view those posts in greater detail. Similarly, a collaborator may click on one or more of UI components 406, 408, or 410 to begin a session in which the collaborator can interact with other collaborators and/or stakeholders. UI 400 thus presents a "dashboard" relating to a particular project 110. It will be understood that the example UI 400 shown in the figure is not intended to be limiting, and that a wide range of UI components and designs may be employed in connection with a particular integrated incubation environment.

Figure 6:
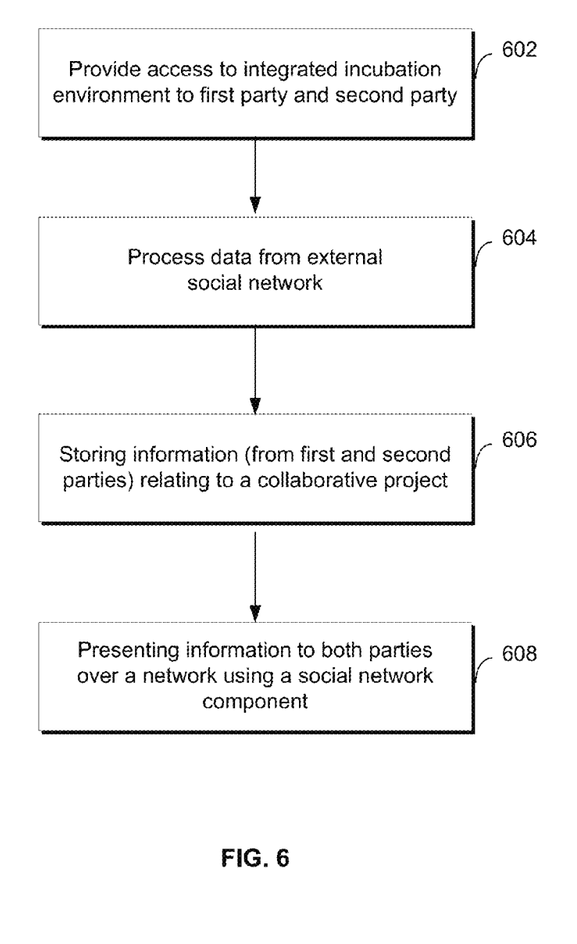
FIG. 6 is flowchart depicting a method in accordance with one embodiment.

In general, referring momentarily to FIG. 6, methods in accordance with various embodiments include providing a first party (e.g., an innovation collaborator 104) and a second party (e.g., a third-party stakeholder 106) access to integrated incubation environment 102 (step 602). Data from one or more external social networks (112 in FIG. 1) relating to a particular entity and/or collaborative project is processed and suitably stored (step 604), along with information relating to the particular collaborative project 110 (step 606). A first portion of the information is received from the first party, and a second portion of the information is received from the second party. Subsequently, the method includes presenting the information to the first party and the second party over a network using at least one social network component (step 608). The nature of such "social network components" is described above.

Figure 7:
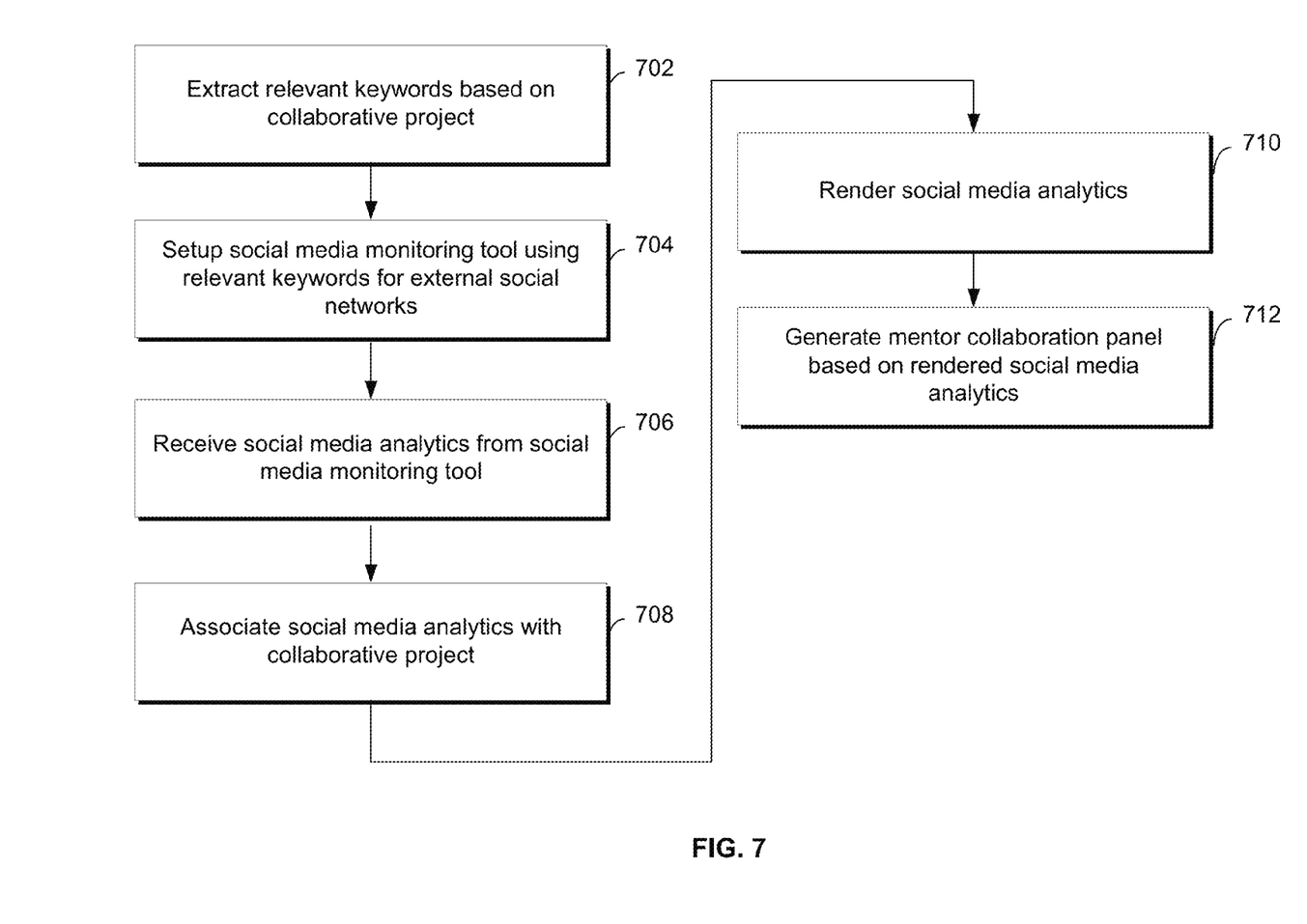
FIG. 7 is a flowchart depicting a method of presenting social media analytics in accordance with one embodiment.

FIG. 7 depicts an exemplary method for determining social media analytics and customer reviews in accordance with one embodiment. First, relevant keywords are extracted based on the collaborative project (step 702). For example, if the collaborative project relates to data-mining of "big data" (extremely large databases) then the keywords "data-mining", "big data", and the like might be extracted. Next, a social media monitoring tool utilized by the integrated incubation environment is set up in an appropriate manner using the extracted keywords. Such social media monitoring tools including, for example, the radian6™ tool offered by Salesforce.com, are configured to monitor and analyze activity on one or more external social networks. The resulting social media analytics are received from the media monitoring tool (step 706), and are associated with the appropriate collaborative project or projects (step 708). That is, a particular set of social media analytics may be applicable to more than one collaborative project. The social media analytics are then suitable rendered (i.e., as a canvas or other graphical UI element) (step 710), and included within a panel, web-page, or other display that incorporates the social media analytics (such as that shown in FIG. 4).

As mentioned above, environment 102 of FIG. 1 may be implemented using a multi-tenant system. In that regard, FIG. 5 presents a conceptual block diagram of an exemplary multi-tenant system suitable for integration with in the integrated incubation environment of FIG. 1 in accordance with one or more embodiments.

Figure 5:
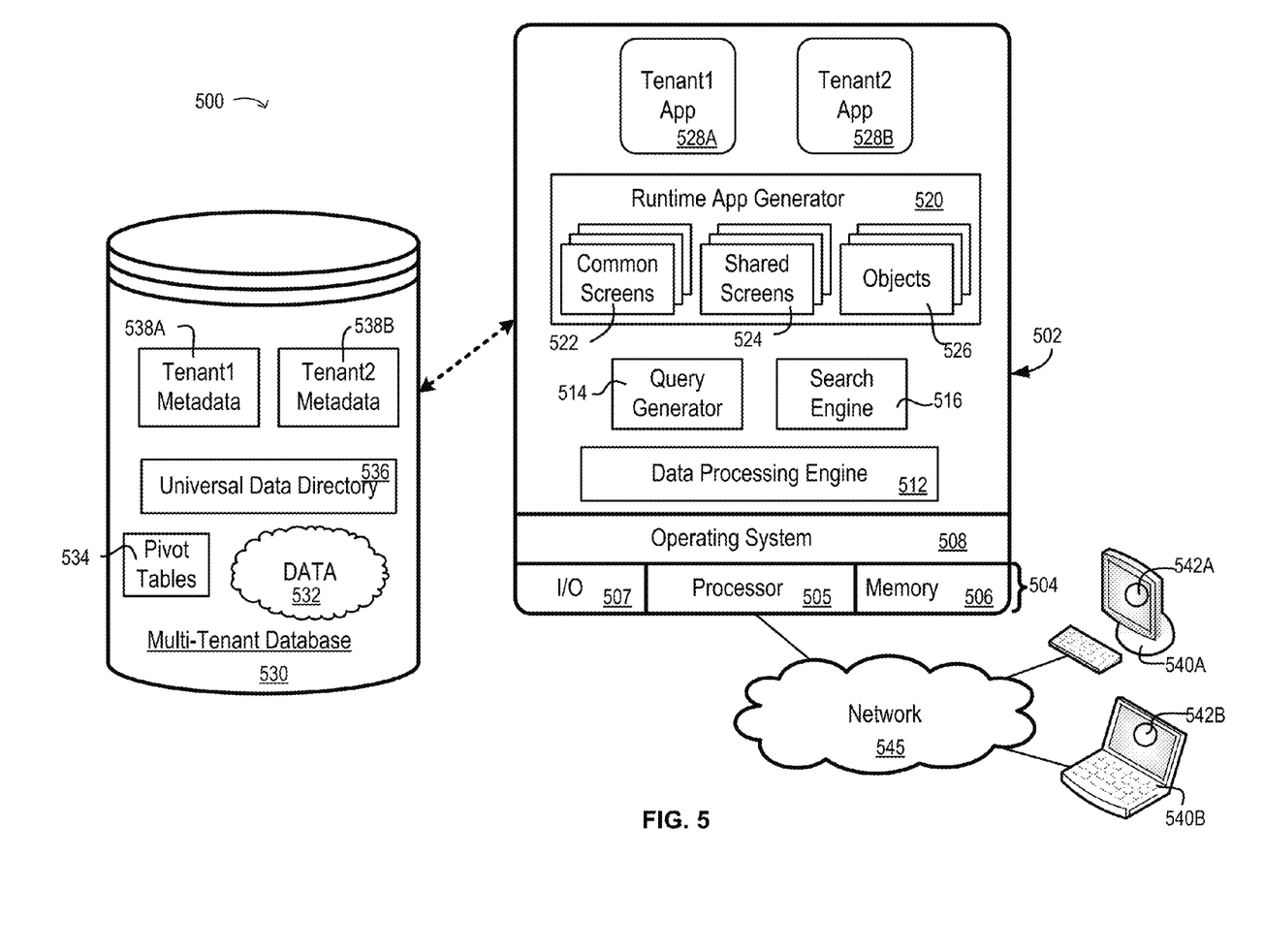
FIG. 5 is a block diagram of an exemplary multi-tenant system suitable for integration with in the integrated incubation environment of FIG. 1 in accordance with one or more embodiments.

In general, the illustrated multi-tenant system 500 of FIG. 5 includes a server 502 that dynamically creates and supports virtual applications 528 based upon data 532 from a common database 530 that is shared between multiple tenants, alternatively referred to herein as a multi-tenant database. Data and services generated by the virtual applications 528 are provided via a network 545 to any number of client devices 540, as desired. Each virtual application 528 is suitably generated at run-time (or on-demand) using a common application platform 510 that securely provides access to the data 532 in the database 530 for each of the various tenants subscribing to the multi-tenant system 500. In accordance with one non-limiting example, the multi-tenant system 500 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. Stated another way, each respective user within the multi-tenant system 500 is associated with, assigned to, or otherwise belongs to a particular tenant of the plurality of tenants supported by the multi-tenant system 500. Tenants may represent customers, customer departments, business or legal organizations, and/or any other entities that maintain data for particular sets of users within the multi-tenant system 500. Although multiple tenants may share access to the server 502 and the database 530, the particular data and services provided from the server 502 to each tenant can be securely isolated from those provided to other tenants. The multi-tenant architecture therefore allows different sets of users to share functionality and hardware resources without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528. The multi-tenant database 530 may alternatively be referred to herein as an on-demand database, in that the multi-tenant database 530 provides (or is available to provide) data at run-time to on-demand virtual applications 528 generated by the application platform 310.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 338 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or application platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request. In this manner, the query generator 514 suitably obtains requested subsets of data 532 accessible to a user and/or tenant from the database 530 as needed to populate the tables, reports or other features of the particular virtual application 528 for that user and/or tenant.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

With continued reference to FIG. 3, the data and services provided by the server 302 can be retrieved using any sort of personal computer, mobile telephone, tablet or other network-enabled client device 540 on the network 545. In an exemplary embodiment, the client device 340 includes a display device, such as a monitor, screen, or another conventional electronic display capable of graphically presenting data and/or information retrieved from the multi-tenant database 530. Typically, the user operates a conventional browser application or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to databases, social networks, user interfaces, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method comprising:
generating upon request, at a server, an integrated incubation environment, wherein the integrated incubation environment is implemented as a multi-tenant database system connected to the server, wherein the multi-tenant database system creates and supports at least one virtual application based on data from a common database shared among multiple tenants, wherein each of the multiple tenants has access to a distinct and separate set of the data from the common database, wherein a subset of the data and services provided from the server to one of the multiple tenants is securely isolated from a second subset of the data and services provided to a remainder of the multiple tenants, and wherein the multiple tenants comprises a subset and a remainder;
providing, by the server over a network, a first party and a second party access to the integrated incubation environment connected to the server, the integrated incubation environment capable of storing information related to a collaborative project of the first party and the second party;
receiving, by the server, a first portion of information related to the collaborative project from the first party to be stored in the integrated incubation environment;
receiving, by the server, a second portion of information related to the collaborative project from the second party to be stored in the integrated incubation environment;
storing, on the server, the information relating to the collaborative project; and
providing, by the server over the network, the information to the first party and the second party through a social media network component, by executing the at least one virtual application supported by the multi-tenant database system, the at least one virtual application configured to:
extract relevant keywords associated with the collaborative project;
configure a social media monitoring tool using relevant keywords for external social networks, wherein the social media monitoring tool is configured to monitor and analyze activity on the social media network component;
receive social media analytics from the social media monitoring tool, wherein the social media analytics are associated with the relevant keywords;
associate the social media analytics with the collaborative project;
render the social media analytics; and
generate a collaboration panel based on rendered social media analytics, wherein the collaboration panel is hosted by the multi-tenant database system;
wherein the social media network component is configured to render a graphical user interface comprising the collaboration panel populated with a status update feed that displays a user-selectable post that includes the information and other details associated with the collaborative project, and wherein the social media analytics comprise the user-selectable post.

2. The method of claim 1, wherein the first portion of the information is received from a first party comprising an innovation collaborator.

3. The method of claim 2, wherein the second portion of the information is received from a second party comprising a third-party stakeholder.

4. The method of claim 1, further including receiving a third portion of the information from at least one external social network.

5. The method of claim 1, wherein the information is presented to the first party and the second party via HTTP.

6. A non-transitory, computer-readable medium comprising computer-executable instructions that, when executed by a processing system, cause the processing system to:
generate upon request, at a server, an integrated incubation environment, wherein the integrated incubation environment is implemented as a multi-tenant database system and is connected to the server, wherein the multi-tenant database system creates and supports at least one virtual application based on data from a common database shared among multiple tenants, wherein each of the multiple tenants has access to a distinct and separate set of the data from the common database, wherein a subset of the data and services provided from the server to one of the multiple tenants is securely isolated from a second subset of the data and services provided to a remainder of the multiple tenants, and wherein the multiple tenants comprises a subset and a remainder;
provide access, by the server over a network, to a first party and a second party to the integrated incubation environment connected to the server, the integrated incubation environment capable of storing information related to a collaborative project of the first party and the second party;
receive, by the server, a first portion of information related to the collaborative project from the first party to be stored in the integrated incubation environment;
receive, by the server, a second portion of information related to the collaborative project from the second party to be stored in the integrated incubation environment;
store, on the server, the information relating to the collaborative project; and
provide, by the server over the network, the information to the first party and the second party through a social media network component, by executing the at least one virtual application supported by the multi-tenant database system, the at least one virtual application configured to:
extract relevant keywords associated with the collaborative project;
configure a social media monitoring tool using relevant keywords for external social networks, wherein the social media monitoring tool is configured to monitor and analyze activity on the social media network component;
receive social media analytics from the social media monitoring tool, wherein the social media analytics are associated with the relevant keywords;
associate the social media analytics with the collaborative project;
render the social media analytics; and
generate a collaboration panel based on the rendered social media analytics, wherein the collaboration panel is hosted by the multi-tenant database system;
wherein the social media network component is configured to render a graphical user interface comprising the collaboration panel populated with a status update feed that displays a user-selectable post that includes the information and other details associated with the collaborative project, and wherein the social media analytics comprise the user-selectable post.

7. The non-transitory, computer-readable medium of claim 6, wherein the computer-executable instructions cause the processing system to receive a third portion of the information from at least one external social network.

8. The non-transitory, computer-readable medium of claim 6, wherein the information is presented to the first party and the second party via HTTP.

9. An integrated incubation environment implemented as a multi-tenant database system that creates and supports at least one virtual application based on data from a common database shared among multiple tenants, the integrated incubation environment comprising one or more processors in communication with one or more memories, to provide:
a server configured to:
securely communicate with a first party and a second party over a network;
generate, upon request, the integrated incubation environment, wherein the integrated incubation environment is connected to the server; and
to provide, over a network, the first party and the second party access to the integrated incubation environment connected to the server, wherein each of the multiple tenants has access to a distinct and separate set of the data from the common database, wherein a subset of the data and services provided from the server to one of the multiple tenants is securely isolated from a second subset of the data and services provided to a remainder of the multiple tenants, and wherein the multiple tenants comprises a subset and a remainder;
a memory of the integrated incubation environment, for storing information relating to a collaborative project, wherein a first portion of the information is received from the first party, and a second portion of the information is received from the second party; and
a social media network component configured to provide the information to the first party and the second party over the network, by executing the at least one virtual application supported by the multi-tenant database system, the at least one virtual application configured to:
extract relevant keywords associated with the collaborative project;
configured a social media monitoring tool using relevant keywords for external social networks, wherein the social media monitoring tool is configured to monitor and analyze activity on the social media network component;
receive social media analytics from the social media monitoring tool, wherein the social media analytics are associated with the relevant keywords;
associate the social media analytics with the collaborative project;
render the social media analytics; and
generate a collaboration panel based on the rendered social media analytics, wherein the collaboration panel is hosted by the multi-tenant database system;
wherein the social media network component is further configured to render a user interface comprising the collaboration panel populated with a status update feed that displays a user-selectable post that includes the information and other details associated with the collaborative project, and wherein the social media analytics comprise the user-selectable post.

10. The integrated incubation environment of claim 9, wherein the first party is an innovation collaborator.

11. The integrated incubation environment of claim 10, wherein the second party is a third-party stakeholder.

12. The integrated incubation environment of claim 9, wherein the information includes a third portion received from at least one external social network.

13. The integrated incubation environment of claim 9, wherein the server further comprises a hidden Markov model training subsystem configured to produce a model related to the collaborative project.

14. The integrated incubation environment of claim 13, wherein the server further includes at least one runtime component configured to produce a graphical depiction of the information based on the model.

* * * * *